United States Patent [19]

Bagshawe

[11] Patent Number: 4,734,262
[45] Date of Patent: Mar. 29, 1988

[54] REACTION MIXTURE HANDLING DEVICE

[76] Inventor: Kenneth D. Bagshawe, 115 George St., London, W.1., United Kingdom

[21] Appl. No.: 598,195

[22] Filed: Apr. 19, 1984

[30] Foreign Application Priority Data

Apr. 29, 1983 [GB] United Kingdom ............. 8311730

[51] Int. Cl.⁴ ........................................... B01L 11/00
[52] U.S. Cl. ................... 422/101; 422/102; 422/119; 210/137; 210/431
[58] Field of Search ............. 422/101, 102, 99, 68, 422/119; 436/177; 210/97, 137, 356, 359, 419, 431, 927, 506, 507, 508

[56] References Cited

U.S. PATENT DOCUMENTS

| | | | |
|---|---|---|---|
| 1,897,572 | 2/1933 | Cornell, Jr. | 210/359 |
| 2,888,331 | 5/1959 | Carpenter | 422/102 |
| 3,298,791 | 1/1967 | Meyer et al. | 422/113 |
| 3,932,277 | 1/1976 | McDermott et al. | 436/177 |
| 3,966,439 | 6/1976 | Vennos | 210/356 |
| 4,052,163 | 10/1977 | Patzner | 422/101 |
| 4,133,457 | 1/1979 | Klassen | 137/849 |
| 4,234,317 | 11/1980 | Lucas et al. | 422/101 |
| 4,272,481 | 6/1981 | Ahlstrom, Jr. et al. | 422/83 |

FOREIGN PATENT DOCUMENTS 2245797 3/1973 Fed. Rep. of Germany ........ 422/68

OTHER PUBLICATIONS

Park, *Biomaterials*, Plenum Press, New York, 1979, pp. 171–172.

*Primary Examiner*—David L. Lacey
*Attorney, Agent, or Firm*—Scrivener and Clarke

[57] ABSTRACT

A reaction mixture handling device comprises a chamber for containing a reaction mixture having an open upper end for introduction of the mixture or components thereof, and an outlet at its lower end. Below the inlet a body of filter material is located together with reaction mixture retaining structure for retaining the reaction mixture in the chamber and which is rendered inoperative on application of a positive pressure to the chamber or a negative pressure to the underside of the filter material. The reaction mixture retaining structure may comprise an impermeable or hydrophobic member which is positioned between the outlet and the filter material and closes the outlet, part of the filter material which is made impermeable or hydrophobic and closes the outlet, or an openable member located beneath the filter material. Application of the differential pressure either causes the filter material to move away from the outlet to open the outlet, or opens the member to permit liquid to flow.

15 Claims, 10 Drawing Figures

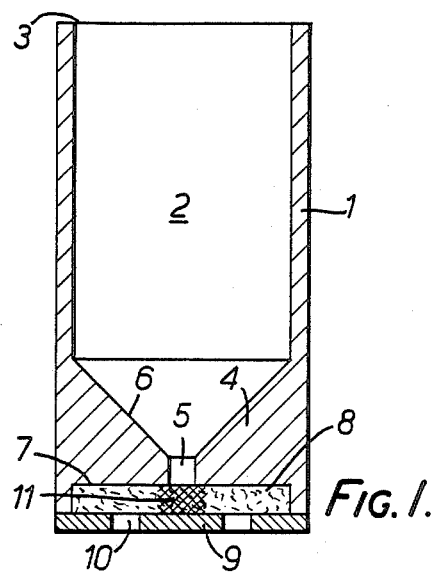
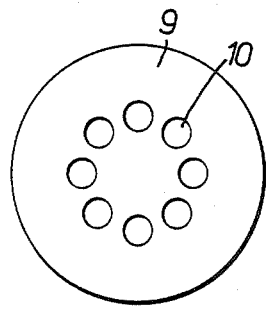
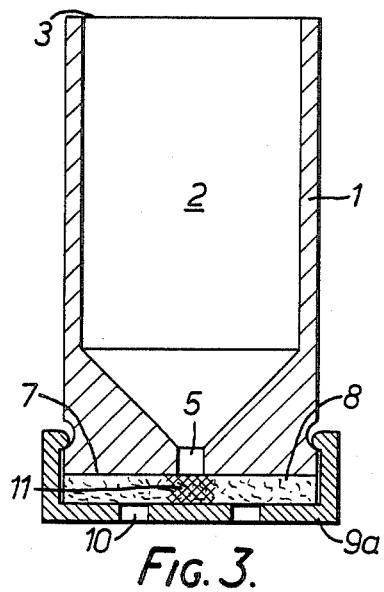
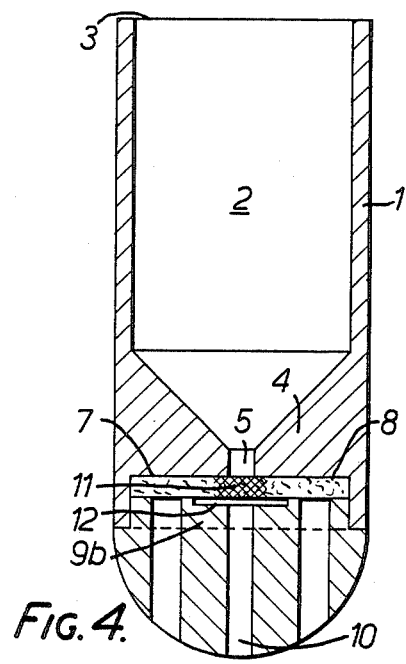

REACTION MIXTURE HANDLING DEVICE

The present invention relates to the handling of reaction mixtures which, at a stage in the reaction, require to be filtered.

In the performance of sensitive immunoassays for proteins, polypeptides, viruses, drugs etc., using radioisotope labelled markers, or other labels, it is usually necessary to separate molecules bound to antibody from molecules not so bound. Automation of the separation step has been facilitated by filtration using a filter tape comprising individual filter elements carried on a carrier tape. However this procedure requires transfer of each reactant solution from a reaction tube to the filter element, the filter element then being passed to a drying station and then to a radio isotope counter, or the liquid filtrate can be passed through a chamber for radioisotope counting or for phototopic measurements.

The means required for transferring each reactant solution to the filter element is complex and it could be advantageous if filtration could take place without the need for the transfer, for example within the reaction tube itself. However the reaction tubes have to be relatively small so that a large number of reactions can be contained within the small space of a laboratory sized analyser, and it is furthermore essential that the reaction tubes and filter means should be cheap to produce because both are thrown away after use.

A reaction tube which includes filter means has a double function. It must provide a reaction chamber in which the reactancts can mix and incubate without interference by the filter, and it must subsequently allow the reactant solution to pass through the filter. It has been proposed to provide a reaction tube which includes filter means by providing in a tube, which is provided at its lower end with a filter, a frangible membrane which separates the reaction chamber from the filter. When filtration is to take place, a probe is introduced through an open upper end of the tube to perforate the membrane. Not only must this operation be closely controlled to ensure that the probe does not perforate the filter at the same time, but it also requires the provision of a mechanism for movement of the probe and is time consuming because the probe has to be reciprocated into and out of each tube. An alternative is to perform the reaction within the interstices of fibrous material, such as glass fibe, which also has filtration or other separation properties. This method has proved useful but the technique of delayed addition of one reactant is difficult, if not impossible, to use with this method because of the slow mixing of the reactants within the interstices of the fibrous material.

According to one aspect of the present invention there is provided a reaction mixture handling device comprising a body providing a chamber for containing a reaction mixture and having an upper inlet for introduction of the mixture of components thereof, an outlet opening in the lower end of the chamber, a body of filter material positioned below the opening, means for retaining the body of filter material below the outlet opening, and means for retaining a reaction mixture in the chamber which is rendered inoperative by application of a differential pressure across the device.

Preferably the outlet opening has a lesser flow cross sectional area than that of the chamber and that of the body of filter material.

The reaction mixture retaining means may be operative to close the outlet opening. Such means for closing the outlet opening may comprise a member located between the filter and the outlet opening and having a flow cross sectional area at least equal to that of the outlet opening but less than that of the body of filter material and which is hydrophobic or impermeable to liquid. Alternatively, the means for closing the outlet opening may be provided by that part of the body of filter material which spans the outlet opening and which is treated to be hydrophobic or impermeable.

In operation, a sub-atmospheric pressure is applied to the underside of the body of filter material, or a super-atmospheric pressure is applied to the chamber, and this causes the means for closing the outlet opening to move away from the outlet opening to allow liquid to flow from the opening on to the filter material.

Alternatively the reaction mixture retaining means may be located below the body of filter material and may comprise a resiliently flexible member including a portion which will, under an applied differential pressure, flex to open an opening in the member through which the filtrate can flow.

The reaction mixture containing chamber may be associated with a second chamber which communicates with the underside of the body of filter material for receiving the filtrate, in the event that this is required to be retained.

The invention will be more fully understood from the following description of embodiments thereof, given by way of example only, with reference to the accompanying drawings, in which:

FIG. 1 is a vertical sectional view through a first embodiment of device according to the present invention;

FIG. 2 is an underneath plan view of the embodiment of FIG. 1;

FIGS. 3 and 4 are vertical sectional views of modifications of the embodiment of FIG. 1;

Figure 5:
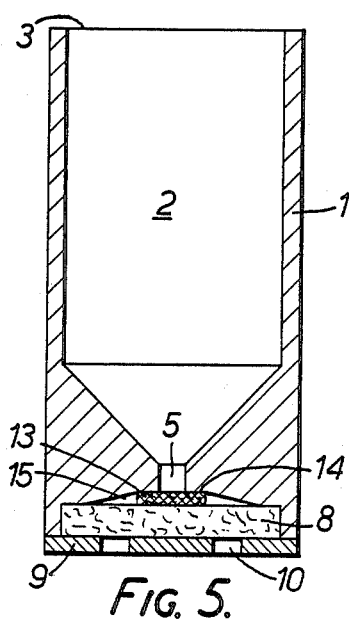
FIG. 5 is a vertical sectional view of another embodiment of device according to the present invention.

The reaction mixture handling device shown in FIGS. 1 and 2 comprise a generally tubular container 1, which as shown has a circular section although it may have a polygonal section, and which provides a chamber 2 for receiving a reaction mixture. The upper end 3 of the container is open for receipt of the reaction mixture or components thereof. The chamber 2 has a lower end wall 4 which is provided with an outlet opening 5 of reduced cross sectional area relative to that of the chamber 2. As shown, the surface 6 of the lower end wall 4 of the chamber 2 is generally conical with the opening at the apex of the cone, to improve draining of liquid downwardly into the opening 5. Below the opening 5 there is provided a recess 7 having a sectional area greater than that of the opening 5 and in which a body of filter material, in the form of a filter disc 8, is received for filtering liquid flowing through outlet 5 from the chamber 2.

The filter disc 8 is held in place by a flexible perforated support 9 which may, as shown, comprise a disc which is bonded peripherally to the lower end of container 1 and is provided with a plurality of apertures 10.

In a modification shown in FIG. 3, the filter retaining means is in the form of a flexible end cap 9a which is, as shown, resiliently engaged or clipped onto the end of container 1, and may be removably attached thereto. With the arrangement shown in FIG. 3 the recess 7 in which the filter disc 8 is received is laterally defined by the cap 9a rather than a prolongation of the wall of the container 1.

In both the above embodiments to prevent liquid in chamber 2 flowing through the filter disc 8 before filtration is required, a central portion 11 of the disc 8 which spans the opening 5 is treated with a material to render it impermeable or hydrophobic so that this portion 11 of the filter disc normally closes opening 5.

When filtration is required, a differential pressure is established across the filter disc 8, either by applying a super-atmospheric pressure to chamber 2 or, preferably, by applying a sub-atmospheric pressure to the underside of disc 9 or cap 9a, and this causes slight bowing of disc 9 or cap 9a permitting the central portion 11 of the filter disc 8 to be moved away from the underside of opening 5 to permit liquid to flow from opening 5 into the filter disc 8 and through the peripheral region of the filter disc surrounding portion 11.

The filter disc 8 may for example be made of glass fibre and the portion 11 may be rendered hydrophobic by treatment with 2% dimethyldichlorosilane.

In a further modification of FIG. 1, shown in FIG. 4, the filter retaining means is in the form of an aperture plug 9b which is received within an extension of the wall of the recess 7 and is fixed permanently or releasably thereto. The plug 9b may be in the form of a planar disc, as shown by broken lines, or may have a rounded or tapered lower end to facilitate location of the container in a receptacle therefor.

Where the plug 9b or other retaining means 9 or 9a is not sufficiently flexible to bow under the application of a differential pressure, a recess 12 as shown in FIG. 4 may be provided in its upper face into which the central part of the filter disc 8 can move to move its upper surface away from the underside of the opening 5 to permit liquid to flow from chamber 2.

Figure 6:
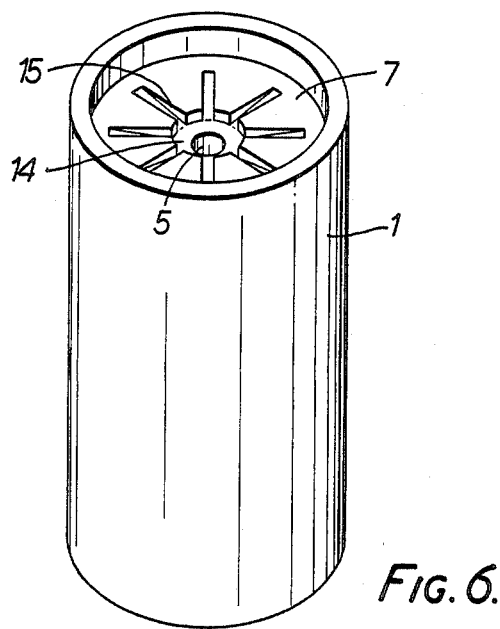
FIG. 6 is a perspective view of the device of FIG. 5 inverted and with the body of filter material and the means for retaining the body of filter material removed.

In another embodiment of reaction mixture handling device shown in FIGS. 5 and 6, in which like parts have been assigned the same reference numerals as are used in FIGS. 1 and 2, instead of rendering portion 11 of the filter disc 8 hydrophobic or impermeable, an additional member 13, which is hydrophobic or non-permeable is provided between opening 5 and filter disc 8. The member 13 is located in a recess 14 between the opening 5 and filter disc 8 and has a sectional area slightly greater than that of opening 5 but less than that of filter disc 8. The operation of this device is similar to that of FIGS. 1 and 2. When a differential pressure is established across the filter disc 8, the support disc 9 will slightly flex permitting the central part of filter disc 8 to move downwardly and member 13 to move away from the end of opening 5 and so permit liquid to flow from chamber 2, over member 13 and onto the filter disc 8. To assist flow of liquid over member 13, a plurality of channels 15 may be provided interconnecting the sides of the recess 14 with the top of recess 7 in which the filter disc 8 is located.

It will be appreciated that the embodiment of FIGS. 4 and 5 may be modified by the provision of a filter retaining cap 9a as shown in FIG. 3, or a plug 9b as shown in FIG. 4, in place of the disc 9.

Figure 7:
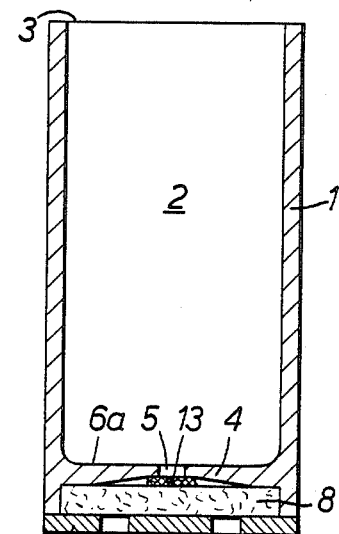
FIG. 7 is a vertical sectional view of a modification of the embodiment of FIG. 5.

For assays in which it is required to view the filter disc 8 optically, e.g. for a colorimetric or fluorescent assay, the embodiment of FIGS. 4 and 5 is modified to provide the lower wall 4 of the chamber 2 with a planar surace 6a, as shown in FIG. 7. At least wall 4 of the chamber 2 is made of a suitable transparent material so that the filter disc 8, in which the coloured or fluorescent substrate is retained during filtration, can be viewed through the lower wall 4.

Figure 8:
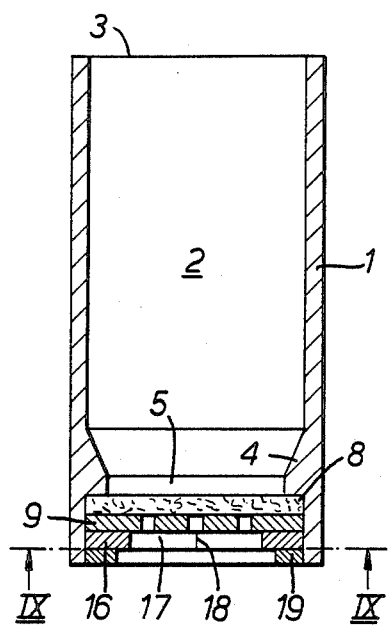
FIG. 8 is a vertical sectional view of a further embodiment of a device according to the present invention.
Figure 9:
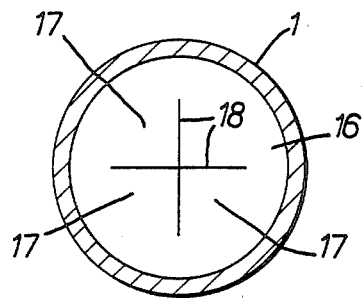
FIG. 9 is a view on the line IX—IX of FIG. 8.

Alternatively, the opening 5 in the lower wall 4 of the chamber 2 may be sustantially enlarged, as shown in FIGS. 8 and 9, so that the filter disc 8 can be viewed directly through the open end 3 of chamber 2. In this embodiment the filter disc 8 is retained in the base of the container 1 between the wall 4 which is provided by an annular retaining bead on the side wall of the chamber 2, and an apertured retaining disc 9. To prevent liquid flowing out of the base of the chamber, the base of the container 1 is closed by a sealing member 16 which, on application of a differential pressure across the reaction mixture, unseals the base of the container to allow filtrate to flow out of the base of the container. As shown the sealing member 16 is in the form of a membrane or disc of resiliently flexible material, e.g. silastic rubber, which is provided with flaps 17, formed by making intersecting cuts 18 in the disc, which normally assume a planar position, as shown, in which the cut edges of the flaps engage and seal against each other. Under an applied differential pressure the flaps 17 flex resiliently downwardlly to create an opening in the member to open the base of the container to permit filtration to take place. The sealing member 16 is retained in the base of the container by any suitable means. As shown, it is retained by a retaining ring 19 fixed in the lower end of the container, which clamps the periphery of the member 16 against the filter disc retaining member 9.

Figure 10:
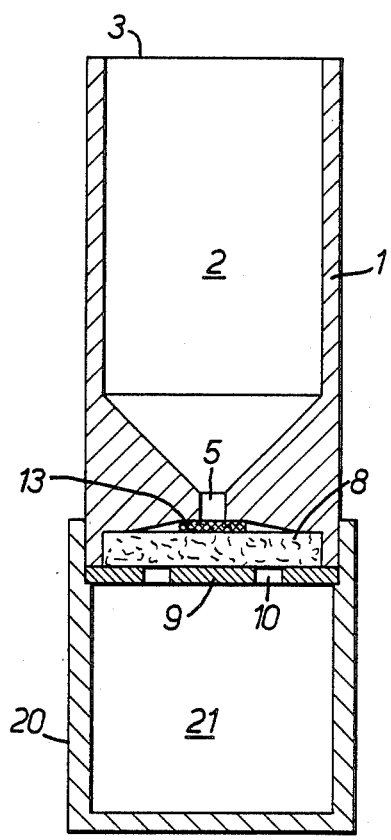
FIG. 10 is a vertical sectional view of yet another embodiment of device according to the present invention.

For assays in which it is required to retain the filtrate, the containers 1 of any of FIGS. 1, 4 or 5 may be associated with a second open topped container 20, as shown in FIG. 10, providing a chamber 21 for receiving the filtrate. The open top of the container 20 is shaped to closely fit the lower end of container 1 and, where a colourimetric analysis is to be performed on the filtrate, container 20 may be provided with opposed optically flat transparent side wall portions (not shown). In use of the assembly of a container 1 and a container 20, filtration may be effected by applying a superatmospheric pressure to chamber 2, chamber 21 shown in FIG. 10 being suitably vented (not shown). Alternatively, where the member 13 or portion 11 of the filter disc 8 is hydrophobic but not impermeable, initially a sub-atmospheric pressure may be applied to chamber 2 for the purpose of creating a sub-atmospheric pressure in chamber 21. As soon as chamber 2 is returned to atmospheric pressure, the sub-atmospheric pressure in chamber 21 causes filtration, as previously described.

The components 1, 9, 9a 9b and, where provided, 16 and 19, of the above described devices may for example be moulded of suitable plastics material such for example as polystyrene, polythene or polypropylene.

There are thus provided reaction mixture handling devices, which provide both a chamber in which a reaction can take place and for filtration of the resulting reaction mixture, which are simple in construction and use.

While in the above described devices, the chamber 2 is provided in a tubular container, it will be appreciated that it may be provided by a recess, which may be circular or polygonal in section, in any suitably shaped body, e.g. in the form of a plate. Additionally, while as described above, each chamber 2 is provided by an individual container, a plurality of chambers 2 may be provided in a single body, e.g. in the form of a regular one or two dimensional array of recesses.

What is claimed is:

1. A reaction mixture handling device comprising a main body providing a chamber for containing a reaction mixture, an inlet opening in the upper end of the chamber for introduction of the mixture or components thereof, an outlet opening in the lower end of the chamber, reaction mixture retaining means located in a first recess in said body below the outlet opening and being held in place to close the outlet opening by a body of filter material located in a second recess below said first recess and into which said first recess opens, at least part of the body of filter material being movable in a direction away from the outlet opening under an applied differential pressure to permit the reaction mixture retaining means to move away from the outlet opening to open the same and allow liquid to flow from the outlet opening, and channel means communicating laterally with the top of the second recess and with a side of the first recess to assist flow of liquid from the outlet opening into the body of filter material when the reaction mixture retaining member is moved away from said outlet opening.

2. A device as claimed in claim 1, wherein the outlet opening has an area through which the reaction mixture will flow and which is less than that of the chamber.

3. A device as claimed in claim 1, wherein the reaction mixture retaining means has an area at least equal to that of the outlet opening but less than that of the body of filter material, and which is hydrophobic to liquid.

4. A device as claimed in claim 1 wherein the filter material is retained in said second recess by an apertured flexible disc.

5. A device as claimed in claim 1, wherein the lower end of the chamber is generally conical with the outlet opening at the apex of the cone.

6. A device as claimed in claim 1, wherein the lower end of the chamber is generally planar and transparent to enable optical viewing of the body of filter material through the inlet opening of the chamber.

7. A device as claimed in claim 1, including a container defining a second chamber positioned and arranged for receiving filtrate from the body of filter material.

8. A device as claimed in claim 1, wherein the reaction mixture retaining means has an area at least equal to that of the outlet opening but less than that of the body of filter material, and which is impermeable to liquid.

9. A reaction mixture handling device comprising a main body providing a chamber for containing a reaction mixture, an inlet opening in the upper end of the chamber for introduction of the mixture or componenets thereof, an outlet opening in the lower end of the chamber, a body of filter material positioned in the region of the outlet opening and through which liquid from the chamber will flow, means for retaining the body of filter material in the region of the outlet opening, and means operative to retain the reaction mixture in the chamber and being rendered inoperative by the application of a differential pressure across the device, said reaction mixture retaining means comprising an element positioned below the filter means in the path of fluid flowing therefrom and providing both aperture means and closing means closing said aperture means in the absence of an applied differential pressure said closing means being movable away from said aperture means under an applied differential pressure to open said aperture means and permit fluid to flow therethrough.

10. A device as claimed in claim 9 said element comprises a resiliently flexible member having at least one portion which is resiliently flexibly movable between an operative position closing said aperture means and an inoperative position opening said aperture means.

11. A device as claimed in claim 10 where said portion of said member is in the form of a flap.

12. A device as claimed in claim 10 wherein said resiliently flexible member is located contiguous to said means for retaining the body of filter material in the region of the outlet opening and wherein said member comprises a plurality of portions formed by intersecting cuts in said member.

13. A device as claimed in claim 9, wherein the lower end of the chamber is generally conical with the outlet opening at the apex of the cone.

14. A device as claimed in claim 9, wherein the lower end of the chamber is generally planar and transparent to enable optical viewing of the body of filter material through the inlet opening of the chamber.

15. A device as claimed in claim 9, including a container defining a second chamber positioned and arranged for receiving filtrate from the body of filter material.

* * * * *